(12) United States Patent  (10) Patent No.: US 8,000,323 B2
So  (45) Date of Patent: Aug. 16, 2011

(54) METHOD AND SYSTEM FOR ANNOUNCING TRAFFIC ENGINEERING PARAMETERS OF COMPOSITE TRANSPORT GROUPS

(75) Inventor: Ning So, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 481 days.

(21) Appl. No.: 12/112,341

(22) Filed: Apr. 30, 2008

(65) Prior Publication Data

US 2009/0324232 A1    Dec. 31, 2009

(51) Int. Cl.
*H04L 12/56* (2006.01)
*H04J 1/16* (2006.01)

(52) U.S. Cl. ......... 370/386; 370/252; 370/254; 370/389

(58) Field of Classification Search ............... 370/252, 370/254, 389, 386
See application file for complete search history.

(56) References Cited

U.S. PATENT DOCUMENTS

| 2005/0195741 A1* | 9/2005 | Doshi et al. ............... 370/230 |
| 2006/0087983 A1* | 4/2006 | Vigoureux et al. ........ 370/252 |
| 2008/0232274 A1* | 9/2008 | Grover ........................ 370/255 |

* cited by examiner

*Primary Examiner* — John Pezzlo

(57) ABSTRACT

An approach is provided for announcing aggregate characteristics of a composite transport group (CTG) for traffic engineering. Information specifying characteristics of a plurality of component links of the CTG is received. An aggregate characteristic of the CTG is determined based the information. The aggregate characteristic is announced to a label switched network for provisioning label switched paths on the CTG.

22 Claims, 8 Drawing Sheets

METHOD AND SYSTEM FOR ANNOUNCING TRAFFIC ENGINEERING PARAMETERS OF COMPOSITE TRANSPORT GROUPS

BACKGROUND INFORMATION

Telecommunication networks have developed from connection-oriented, circuit-switched (CO-CS) systems, such as the public switched telephone network (PSTN), utilizing constant bit-rate, predefined point-to-point connections to connectionless, packet-switched (CNLS) systems, such as the Internet, utilizing dynamically configured routes characterized by one or more communication channels divided into arbitrary numbers of variable bit-rate channels. With the increase in demand for broadband communications and services, telecommunication service providers are beginning to integrate long-distance, large-capacity optical communication networks with these traditional CO-CS and CNLS systems. Typically, these optical communication networks utilize multiplexing transport techniques, such as time-division multiplexing (TDM), wavelength-division multiplexing (WDM), and the like, for transmitting information over optical fibers. However, an increase in demand for more flexible, resilient transport is driving optical communication networks toward high-speed, large-capacity packet-switching transmission techniques that enable switching and transport functions to occur in completely optical states via one or more packets. This technological innovation carries with it a new burden to provision reliable service over these networks, i.e., service that is capable of withstanding link and node failure while also maintaining high transmission capacity. As a result, traffic engineering plays an important role in providing high network reliability and performance. However, given that a multitude of networks operate using various protocols, there is a continual challenge for service providers to ensure proper exchange of traffic engineering parameters across networks.

Therefore, there is a need for an approach that provides for effective and efficient announcement of traffic engineering parameters across multiple networks.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for announcing traffic engineering parameters for composite transport groups are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to traffic engineering (TE) parameter advertisement over a multi-protocol label switching (MPLS) network, it is contemplated that the various exemplary embodiments are also applicable to other equivalent technologies and transport networks.

Figure 1:
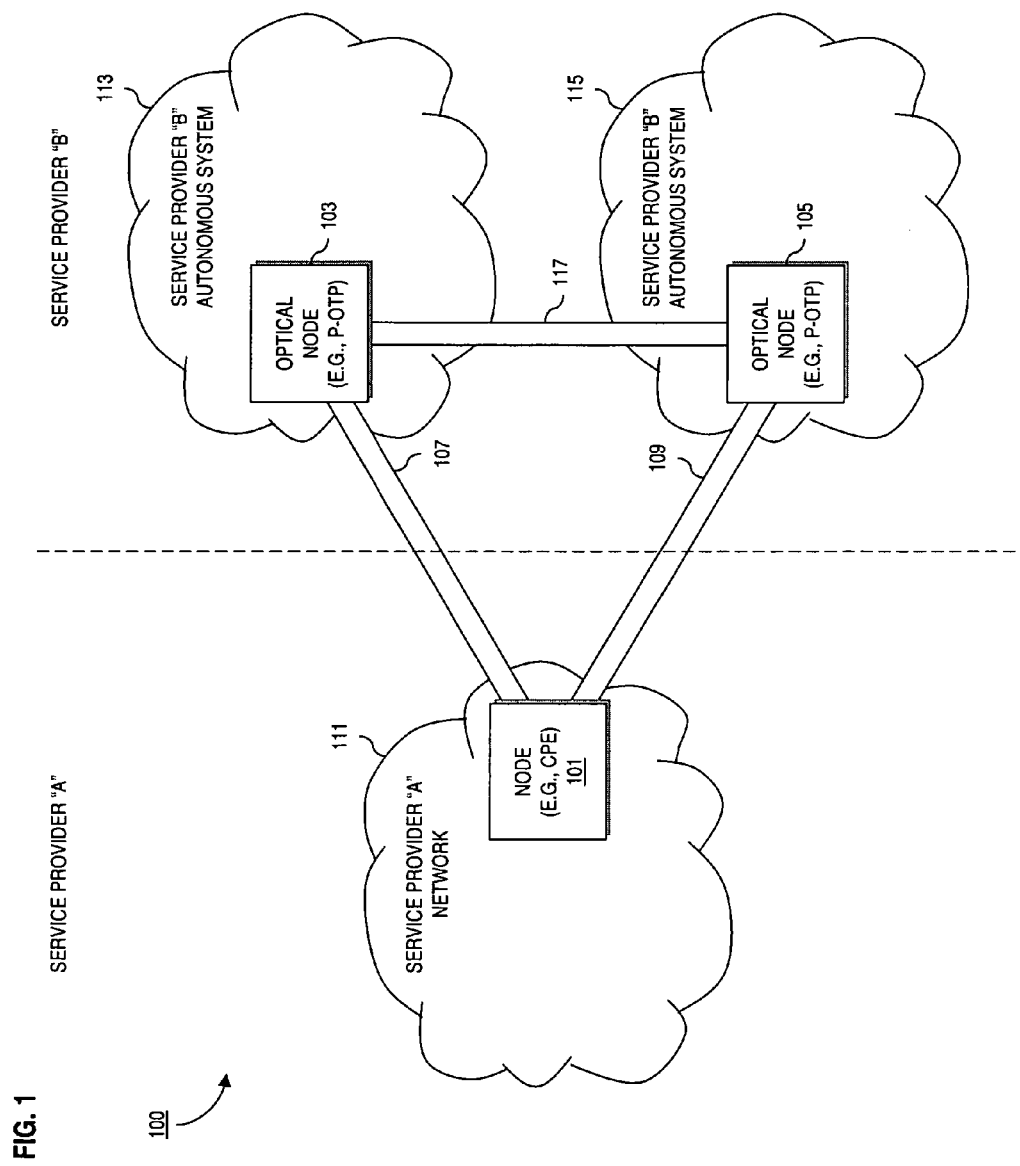
FIG. 1 is a diagram of a system configured to support traffic engineering parameter announcement for composite transport groups, according to an exemplary embodiment.

FIG. 1 is a diagram of a system configured to support traffic engineering parameter announcement for composite transport groups, according to an exemplary embodiment. For the purposes of illustration, a system 100 provides advertisement of traffic engineering (TE) parameters (or aggregate characteristics) of composite transport groups (CTG) established between client nodes (e.g., node 101) and one or more optical nodes (e.g., optical nodes 103 and 105) within a packet-switched optical infrastructure. By way of example, the system 100 encompasses networks of disparate service providers: service provider "A" and service provider "B." In this manner, optical links 107 and 109 may be considered "off-network" links (i.e., transport channels extending between network 111 of service provider "A" and autonomous systems (AS) 113 and 115 of service provider "B"), while optical link 117 may be considered an "on-network" link (i.e., a transport channel extending between AS 113 and 115 of service provider "B"). It is noted that in an alternative embodiment, AS 113 and 115 can be sub-networks of a single AS. In certain embodiments, client (subscriber or customer) node 101 is customer premise equipment (CPE) with optical nodes 103 and 105 under control of a service provider, which in this instance is service provider "B." Additionally, it is contemplated that node 101 can be owned by the service provider. While specific reference will be made thereto, it is contemplated that system 100 may embody many forms and include multiple and/or alternative components and facilities.

Traffic engineering (TE), i.e., the ability to control and manipulate the flow of network traffic, has the capability to alleviate this burden via resource reservation, fault-tolerance, and optimization of transmission resources. Composite transport groups (CTG), i.e., logical bundling of physical and/or logical links that are viewed by high layer routing and switching protocols as single logical interfaces, can also lessen the burden by simplifying bandwidth management, improving bandwidth utilization, and delivering cost-effective protection schemes. However, before network traffic can be engineered onto CTGs, the characteristics (or parameters) of the CTGs must be announced to the transport network.

It is recognized that multi-protocol label switching (MPLS) traffic engineering (TE) has been developed to provide network administrators with the ability to control and manipulate the flow of traffic through a network. MPLS-TE utilizes label switching techniques to construct label switched paths (LSP) on links interconnecting nodes of a network. Routing protocols, such as open-shortest path first (OSPF) and intermediate system to intermediate system (IS-IS), are utilized to determine LSP routes through the network, as well as govern the distribution of routing information between nodes of the network. OSPF and IS-IS utilize various attributes characterizing the links, such as available bandwidth, administration cost, etc., to determine LSP routes and, thereby, require nodes of the network to report (or announce) these characteristics concerning any directly connected links. It is noted that these attributes (or characteristics) may also be referred to as TE parameters. Unfortunately, as the topology of modern day transport networks become more and more complex, the announcement and utilization of TE parameters becomes increasingly onerous and inefficient.

Therefore, the approach of system 100, according to certain embodiments, stems from the recognition that provisioning CTGs in support of MPLS-TE logically reduces the complexity of network topology, as well as reduces the amount of TE parameters that must be announced. In turn, MPLS-TE is enhanced and routing scalability is improved. This is because CTGs manage sets of "component connections" (i.e., logical channels) as "composite connections," as well as manage associations between client node instances and composite connections, which enable CTGs to dynamically distribute network traffic over the component connections transparently from the nodes transmitting and receiving a flow of traffic. In other words, CTGs, among other features, enable individual pathways to carry network traffic from multiple client nodes, maintain independent pathway transport availabilities and capacities, and provide for disparate transport rates, all the while enabling these individual pathways to provide pathway protection for one another. Furthermore, provisioning CTGs in support of MPLS-TE only requires the CTGs to be announced as single TE pathways that are characterized by aggregate TE parameters, instead of having to individually report a multitude of component connections and their mass of associated TE parameters. Namely, when an LSP is established, only the aggregate CTG pathway need be identified, such that provisioning the LSP over the CTG becomes a local matter transparently resolved by the CTG, as opposed to the nodes transmitting and receiving the flow of traffic.

According to one embodiment, system 100 supports TE parameter announcement based on the configuration of a CTG established between a client node 101, such as a client device, router, switch, or any other suitable customer premise equipment (CPE) (or Provider Edge (PE)), and two or more optical nodes, (e.g., optical nodes 103 and 105), such as a reconfigurable optical add/drop multiplexer (ROADM), or other suitable optical transport platform (e.g., P-OTP (packet optical transport platform)). That is, an aggregate characteristic of the CTG may be determined and announced to other (or external) network based on and using individual characteristics of the plurality of component links (or connections) forming the CTG. The aggregate characteristics can be viewed as "external parameters"—i.e., external to the CTG network, while the individual characteristics can be referred to "internal parameters."

It is noted that CTGs of system 100 may be configured to support connection-oriented flows, e.g., network traffic embodying, for example, information packetized into one or more packets. Connectionless communications may also be encapsulated within connection-oriented connections. In exemplary embodiments, one CTG (or composite connection) may be established for transport of network traffic from client node 101 to optical node 103, and may include a first set (or bundle) of logical channels (or component connections), while another CTG may be established for transport of network traffic from client node 101 to optical node 105, and may include a second set of logical channels. The first set of logical channels may include a logical channel defined by optical link 107 (e.g., a primary channel) and a logical channel defined by the conjunction of optical links 109 and 117 (e.g., a secondary channel). The second set of logical channels may include a logical channel defined by optical link 109 (e.g., a primary channel) and a logical channel defined by the conjunction of optical links 107 and 117 (e.g., a secondary channel). It is contemplated; however, that logical channels may also be grouped in multiple CTGs.

The characteristics of the component links (i.e., CTG internal parameters), according to particular embodiments, may correspond to component link administrative costs (or TE metrics), physical bandwidths of the component links, connections (or pathways) on the component links consuming bandwidth, connection placement priorities, connection holding priorities, and/or connection over-subscription factors. In turn, the aggregate characteristic (i.e., CTG external parameters) of the CTG may correspond to a CTG administrative cost utilized in shortest path computations, a CTG available bandwidth for supporting one or more LSPs on the CTG, and/or a maximum LSP bandwidth capable of being provisioned on the CTG. In exemplary embodiments, one or more of these aggregate characteristics, such as the CTG available bandwidth and/or the maximum LSP bandwidth, may be determined and announced per priority (e.g., class of service).

According to other embodiments, network traffic may be transparently routed over a CTG based on one or more aggregate characteristics of the CTG. That is, a pathway, such as a label switched pathway, may be established over the CTG by a transmitting node (e.g., client node 101) and a receiving node (e.g., node 103 or 105); however, the CTG may independently provision the pathway onto one or more component connections of the CTG. In this manner, system 100 permits node 101 to treat CTGs as physical trunks, whereas the CTGs handle the routing of traffic on its own. This preserves the configurations at node 101, as well as at optical nodes 103, 105. Thus, the use of CTGs can, for instance, save up to 50% access cost compared to traditional systems. Further, CTGs can also save up to 50% on port costs. Further, customer provisioning can be simplified at node 101 and MPLS-TE can be more easily and efficiently applied.

As seen in FIG. 1, system 100 includes networks 111, 113, and 115, which include nodes 101, 103, and 105, respectively. In exemplary embodiments, system 100 is a connection-oriented transport environment having one or more optical links (e.g., optical links 107-109) established therein, wherein individual optical links embody optical fibers configured to carry data between two nodes, e.g., between nodes 101 and 103. It is noted that optical links 107, 109, and 117 may be automatically setup and torn down by means of any suitable signaling protocol, e.g., label distribution protocol (LDP), targeted LDP (TLDP), resource reservation protocol for traffic engineering (RSVP-TE), etc. Accordingly, optical links 107, 109, and 117 may carry information over various wavelengths or "channels." Routing protocols may include OSPF, IS-IS, border gateway protocol (BGP), interior gateway protocol (IGP), or any other suitable link-state or optimized link-state routing protocol.

Networks 113-115 may be any type of wired and/or wireless transport network, such as a local area network (LAN), metropolitan area network (MAN), wide area network (WAN), etc. At least a portion of networks 113-115 comply with the International Telecommunications Union-Telecommunication (ITU-T) standards recommendation working draft G.800 titled, "Unified Functional Architecture of Transport Networks," which is incorporated herein, by reference, in its entirety. Further, networks 113-115 may be configured to support MPLS-TE.

Client node 101 may be any suitable customer premise equipment, such as a computing device, router, switch, etc., while optical nodes 103 and 105 may be any suitable optical transport platform, such as a terminal multiplexor, a reconfigurable add/drop multiplexer, photonic switch, optical cross-connect with optical-electrical-optical conversion, synchronous optical networking cross-connect, signal regenerator, router, switch, or any other suitable optical networking interface, such as a packet optical transport platform.

Accordingly, information transport can occur between nodes 101-105 of networks 111-115 via optical links 107, 109, and 117, which represent channels (or paths) along which packets may be transported. As such, a topology of system 100 can be characterized via optical links 107, 109, and 117, which further characterize the available transport capacity (e.g., bandwidth capacity) between nodes 101-105 of networks 113-115. Thus, during optical link configuration, optical links 107, 109, and 117 may be established and grouped into one or more CTGs for provisioning network traffic among and between nodes 101-105. As such, CTGs give nodes 101-105 the property of adjacency when viewed by higher layer networking protocols, such as OSPF, IS-IS, etc.

Figure 2:
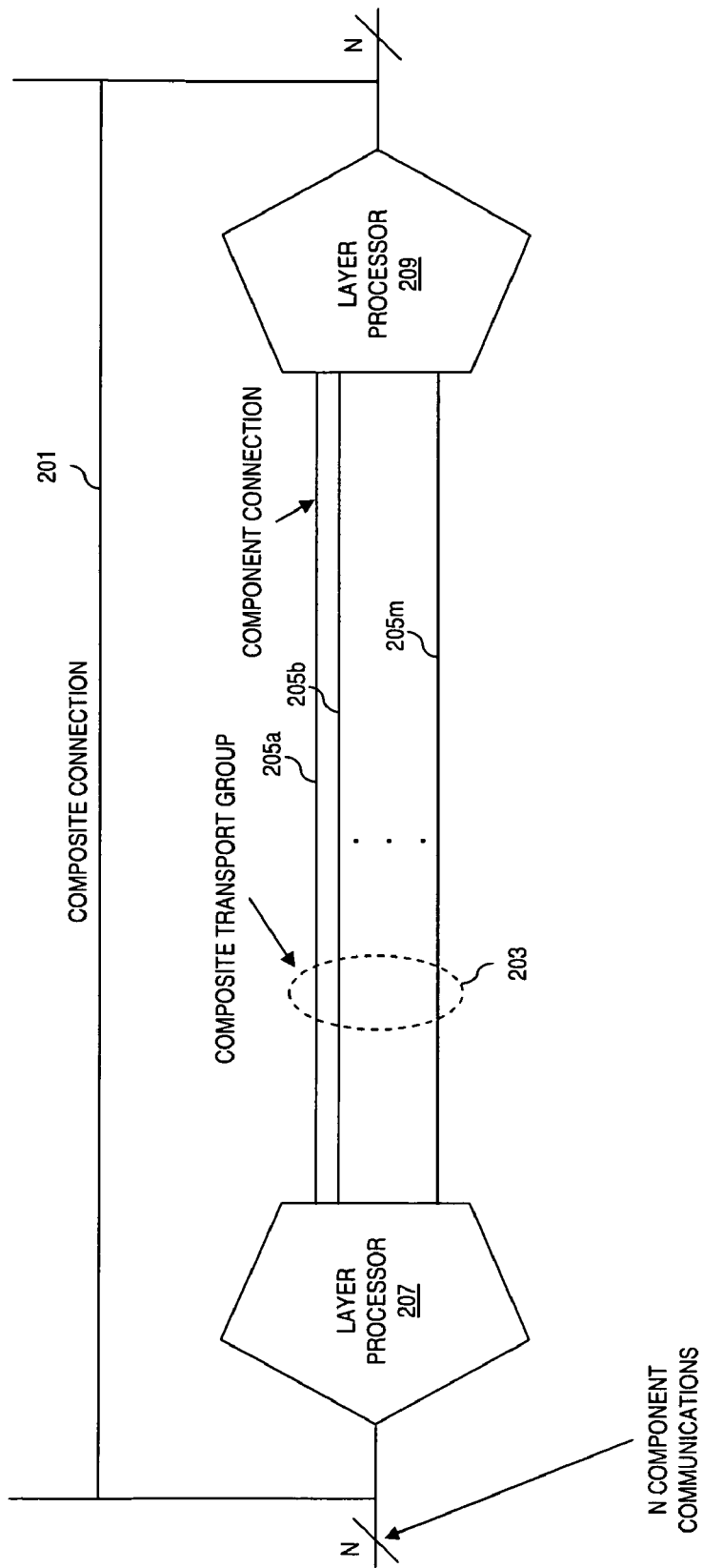
FIG. 2 is a diagram of a composite transport group, according to an exemplary embodiment.

FIG. 2 is a diagram of a composite transport group, according to an exemplary embodiment. As shown, composite connection 201 is made available via CTG 203, which includes one or more parallel component connections (e.g., physical and/or logical links), e.g., component connections 205a-205m, sharing similar ingress and egress points. Accordingly to one embodiment, CTG 203 ingress and egress points correspond to nodes 101-105. For instance, node 101 may be an ingress point of two CTGs, while nodes 103 and 105 may be respective egress points of the two CTGs. Additionally, nodes 103 and 105 may embody "net hop" nodes on a path of the CTGs, i.e., on a path of a component connection of a CTG.

From the perspective of CTG 203, each component connection 205a-205m acts as an independent transportation entity, and therefore, enables independent transportation path availabilities (e.g., physical and/or available bandwidths) for composite connection 201 for network traffic. That is, if network traffic is sequenced at an ingress point and transported over one or more component connections (e.g., component connections 205a-205m), then the network traffic may or may not arrive at an egress point in the same sequential order. Thus, when information is transported via composite connection 201 utilizing CTG 203, a layer processor (LP) at the ingress (e.g., LP 207) distinguishes component connections 205a-205m by processing each packet and distributing the packets over composite connection 201 via one or more of component connections 205a-205m. The ability of LP 207 to distinguish between component connections 205a-205m is dependent upon packet header format and information encoded therein, such as one or more labels for label-switch routing. Thus, LP 207 routes network traffic transparently from the entities attempting to transport and receive the traffic. In this manner, a network gains transport scalability via composite connection 201 because individual component connections can be independently added, removed, and/or resolved by CTG 203, and since the transportation entities are only privy to the fact that composite connection 301, as a whole, is operational, the configuration of the transportation entities need not be affected.

Thus, composite connection 201 made available via CTG 203 can be applied in both connection-less packet-switched (CL-PS) optical networks, as well as in connection-oriented packet-switched (CO-PS) optical networks. In CL-PS environments, component connections 205a-205m can exist as point-to-point links between autonomous systems (e.g., autonomous systems 113 and 115). Optical nodes 103 and 105 utilize information encoded in packet headers provided by, for example, client nodes (e.g., node 101) to distinguish between client communications. That is, a processing entity (or control interface) of optical nodes 103 and 105 utilize this information to differentiate between component connections (e.g., component connections 205a-205m) and distribute network traffic over one or more CTGs (e.g., CTG 203). Thus, network traffic transported via CTG 203 is "seen" by client nodes (e.g., node 101) as "belonging" to composite connection 201, as opposed to the particular component connection 205a-205m "actually" supporting the flow of network traffic.

In CO-PS environments, component connections 205a-205m of CTG 203 can be configured as point-to-point links, as above, or as point-to-point paths. Paths may be established over one or more optical links (e.g., optical links 107, 109, and/or 117) and, thereby, traverse one or more nodes (e.g., nodes 101-105). For composite connection 201 to support multiple communications from client nodes (e.g., node 101) information may be encoded within individual packet headers to differentiate between communications. Accordingly, at composite connection 201 ingress, LP 207 can use this information to distribute packets over component connections 205a-205m, which enables multiple composite connections 201 to be configured over a CTG, such as CTG 203. Further, LP 207 may, when determining which component connection to utilize to support transport, use this information to perform traffic engineering and routing processes, e.g., to assign resource capacity or priority for individual communications. In particular embodiments, this information may be acquired from a network administrator or network management system (not shown), as opposed to the packet headers. Thus, a composite connection 201 may be traffic engineered per component connections 205a-205m, as well as traffic engineered based on component connection attributes, e.g., bandwidth capability, operational status, over-subscription, and the like, or node 101 attributes, e.g., allocated capacity, priority, origination address, destination address, etc.

Figure 3:
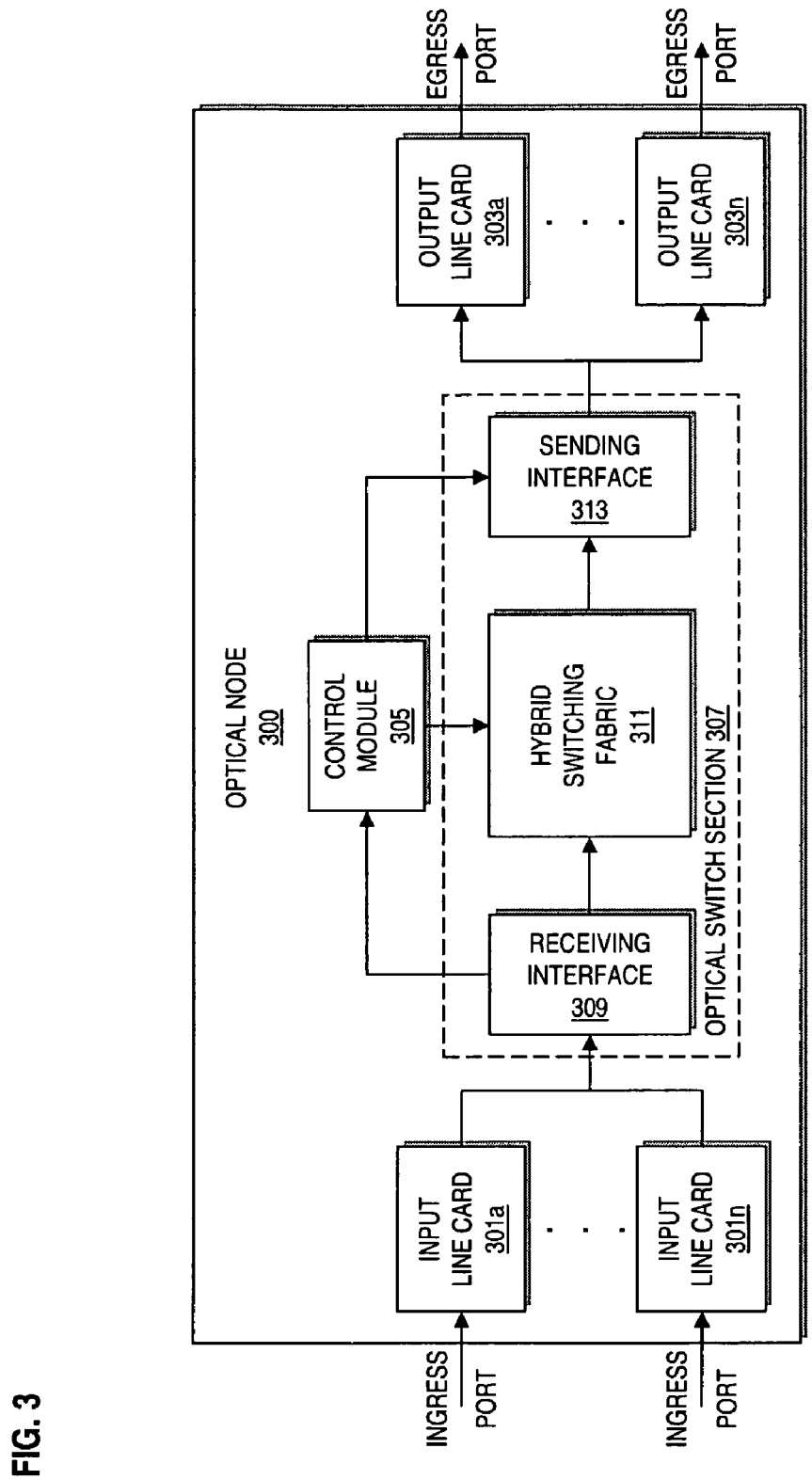
FIG. 3 is a diagram of an optical node configured to provide composite transport groups, according to an exemplary embodiment.

FIG. 3 is a diagram of an optical node configured to provide composite transport groups, according to an exemplary embodiment. For descriptive purposes, optical node 300 is described with respect to packet switching; however, may include functionality for optical burst switching, time division multiplexing (TDM), wavelength-division multiplexing (WDM), or any other suitable signal transfer schemes. As shown, optical node 300 includes input line cards 301a-301n, output line cards 303a-303n, control interface 305, and optical switch section 307; however, it is contemplated that optical node 300 may embody many forms. For example, optical node 300 may comprise computing hardware (such as described with respect to FIG. 8), as well as include one or more components configured to execute the processes described herein for establishing CTGs and/or announcing TE parameters of a CTG supported by optical node 300. Furthermore, it is contemplated that the components of optical node 300 may be combined, located in separate structures, or separate physical locations. In other words, a specific topology is not critical to embodiments of optical node 300 or system 100 for that matter.

According to one embodiment, input line cards 301a-301n act as "n" input interfaces (ingress points) to optical node 200 from "n" transmitting sources (e.g., node 101), while output line cards 303a-303n act as "n" output interfaces (egress points) from optical node 300 to "n" destination nodes (e.g., optical nodes 103 and 105). When packets arrive at optical node 300, input line cards 301a-301n port packets to receiving interface 309 of optical switch section 307. Receiving interface 309 separates headers and payloads from individual packets. Header information is provided to control interface 305 for routing purposes, while payloads are switched to destination output line cards 303a-303b via hybrid switching fabric 311 and sending interface 313. That is, hybrid switching fabric 311 routes payloads to appropriate pathways on sending interface 313, whereby updated headers are combined with switched payloads. The combination is output to destination nodes via output line cards 303a-303n.

In particular implementations, control interface 305 is configured to provision one or more logical channels through hybrid switching fabric 311 based on system 100 topological information. These logical channels can be grouped into one or more CTGs. According to one embodiment, control interface 305 establishes the aforementioned CTGs for transport of network traffic from client node 101 to optical node 103, and from client node 101 to optical node 105.

Figure 4:
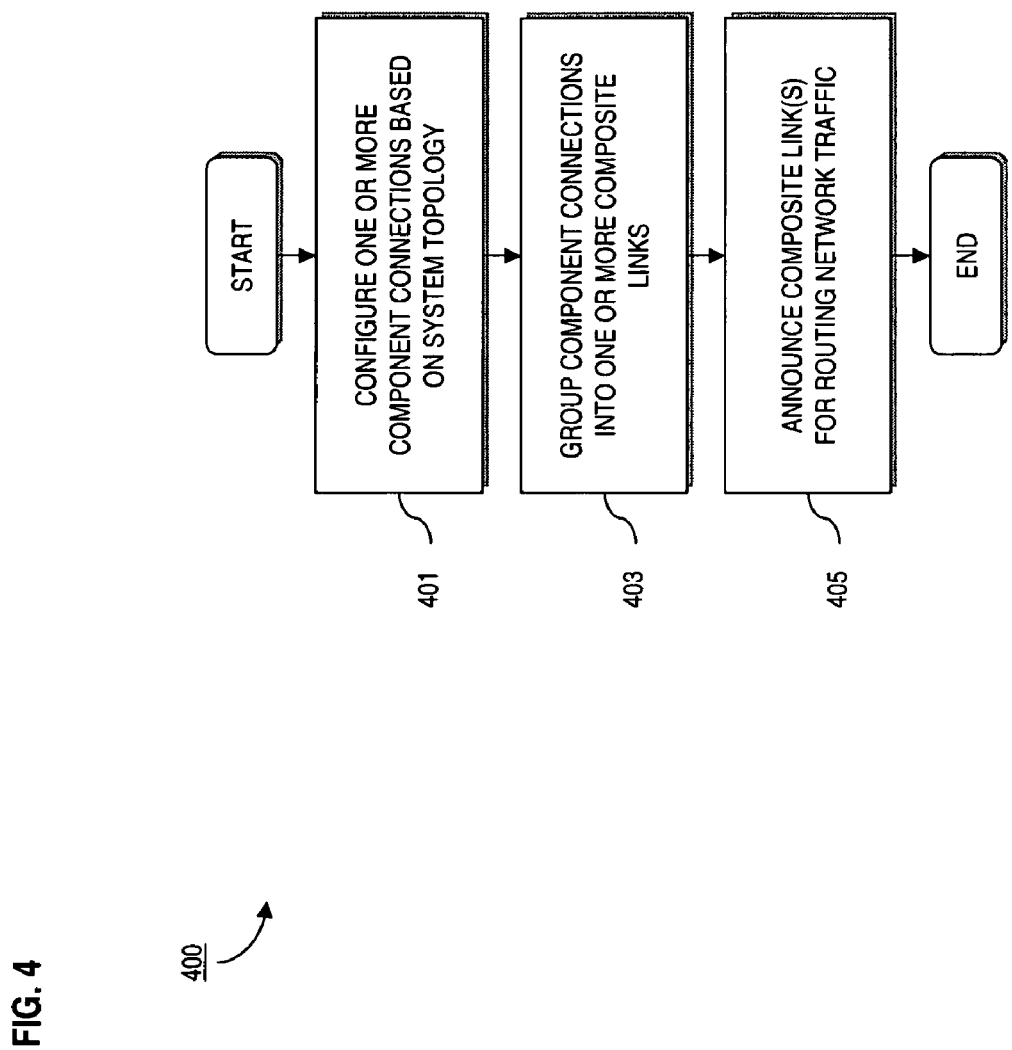
FIG. 4 is a flowchart of a process for establishing a composite transport group, according to an exemplary embodiment.

FIG. 4 is a flowchart of a process for establishing and announcing a composite transport group, according to an exemplary embodiment. For illustrative purposes, process 400 is described with reference to FIGS. 1 and 2. It is noted that process 400 assumes the existence of one or more previously established (or constructed) physical connections (e.g., optical links 107, 109, and 117) configured to transport network traffic, such as user information or network control information. The steps of process 400 may be performed in any suitable order or combined in any suitable manner.

At step 401, one or more optical nodes (e.g., optical nodes 103 and 105) configure one or more component connections (i.e., logical channels) based on a topology of system 100, i.e., based on the establishment of one or more physical connections (e.g., optical links 107, 109, and 117). Individual component connections may be configured over an optical link (e.g., optical link 107) or over a group of optical links (i.e., a path), such as a path defined by optical links 109 and 117. In this manner, component connections are independent channels configured for transporting information, wherein each component connection is individually characterized by its own transport availability, i.e., existence, administrative cost, physical bandwidth, provisioned bandwidth, operational status, placement priority, holding priority, and the like. Thus, in step 403, various component connections may be grouped into one or more CTGs, such that any given CTG (e.g., CTG 203) includes several parallel component connections (e.g., component connections 205a-205m) establishing a transport route from a desired point "A," e.g., node 101, to a desired point "B," e.g., optical node 103. For example, system 100 may be characterized by two CTGs, e.g., one CTG may embody optical link 107 (i.e., a physical component connection) and the conjunction of optical links 109 and 117 (i.e., a logical component connection or a path), and the second CTG may embody optical link 109 and the conjunction of optical links 107 and 117. The characteristics of a composite connection (or CTG) may be stored to a memory (not shown) of, for example, optical nodes 103 and 105 and/or any other suitably accessible repository (not shown) of system 100.

According to one embodiment, the CTG characteristics may be stored to one or more tables that provide network traffic visibility so as to enable optical nodes 300 the ability to maximize and efficiently allocate available bandwidth among various information transporting nodes, e.g., node 101, based on, for instance, composite connection characteristics determined based on and using component connection characteristics. In essence, CTG characteristics aid in the design, implementation, and maintenance of quality of service by providing knowledge of one or more traffic instances. Thus, once one or more composite connections are established, the composite connections may be announced to the network for engineering traffic onto the composite connections(s), per step 405. That is, network traffic, such as packetized optical signals, may be transported over one or more component connections (e.g., component connection 205a-205m), which are defined by one or more optical links (e.g., optical links 107, 109, and 117) based on CTG announcement.

Figure 5:
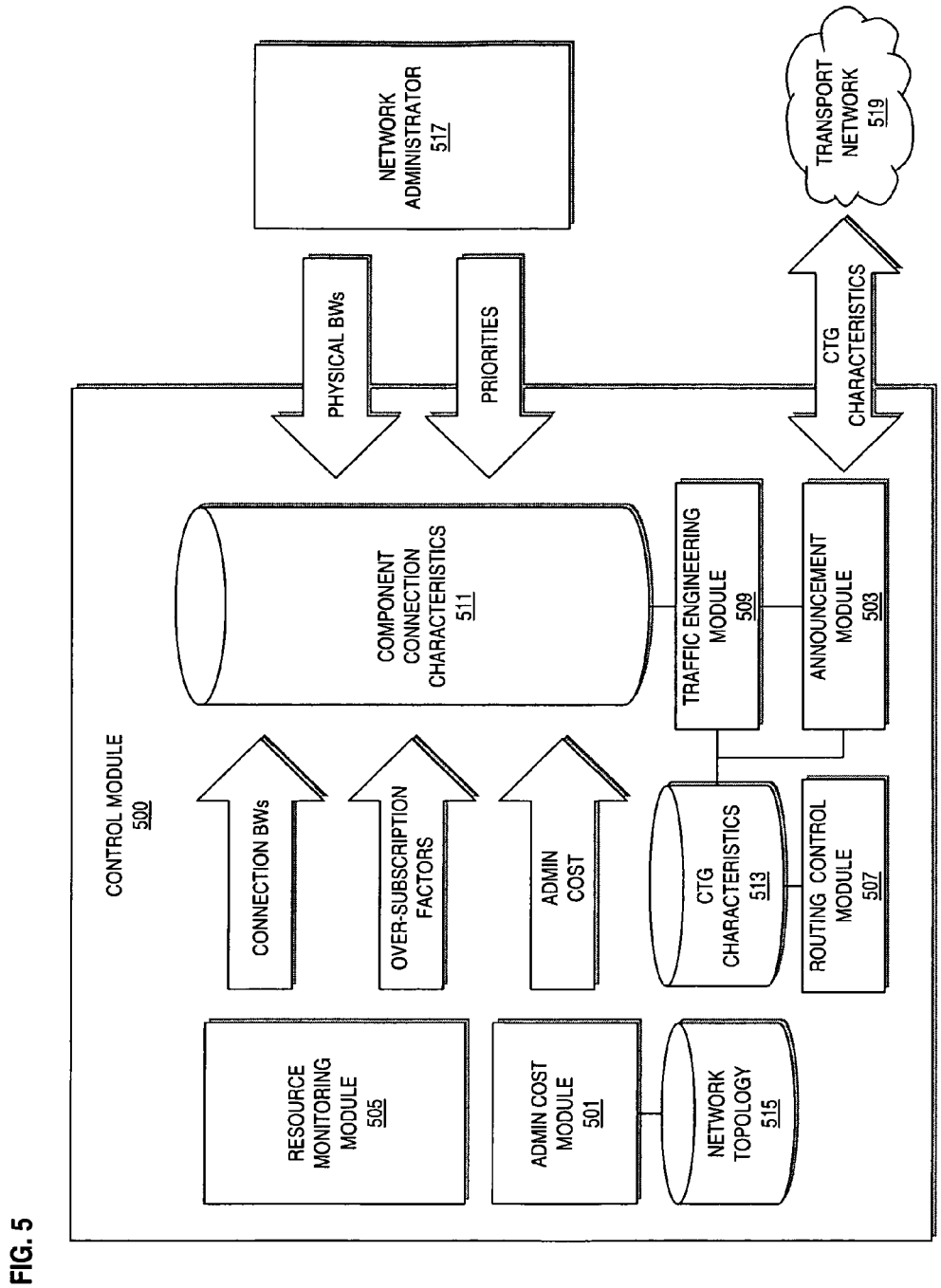
FIG. 5 is a diagram of a control module configured to determine and announce traffic engineering parameters of composite transport groups, according to an exemplary embodiment.

Referring momentarily to FIG. 3, control module 305 may also be configured to determine and/or announce TE parameters of a configured CTG. FIG. 5 is a diagram of a control module configured to determine and announce traffic engineering parameters of composite transport groups, according to an exemplary embodiment. As shown, control module 500 includes administrative cost module 501, announcement module 503, resource monitoring module 505, routing control module 507, and traffic engineering module 509, as well as component connection characteristics repository 511, CTG characteristics repository 513, and network topology repository 515; however, it is contemplated that control module 500 may embody many forms. For example, control module 500 may comprise computing hardware (such as described with respect to FIG. 8), as well as include one or more components configured to execute the processes described herein for determining and announcing TE parameters of CTGs. It is contemplated that that the components of control model may be combined, located in separate structures, or separate physical locations.

In exemplary embodiments, TE module 509 is configured to determine one or more CTG characteristics (or CTG TE parameters) based on and using one or more component connection attributes characterizing the component connections forming a CTG. Component connection characteristics may be obtained from component connection characteristics repository 511 or from any other suitable memory or repository of control module 500, optical node 300, and/or system 100. According to one embodiment, component connection characteristics repository 511 stores information corresponding to component connection administrative costs (or TE metrics), physical bandwidths of component connections, connections (or pathways) on the component connections consuming bandwidth, connection placement priorities, connection holding priorities, and/or connection over-subscription factors. This information may be acquired from administrative cost module 501, resource monitoring module 505, and/or a network administrator 517 or other network management system (not shown) of system 100.

Administrative cost module 501 can be configured to determine the administrative costs of component connections based on topological information stored to network topology repository 515, which may be populated by utilizing one or more of the aforementioned signaling and/or routing protocols or pre-configured by a network administrator. Resource monitoring module 505 monitors bandwidth consumption of connections provisioned via one or more component connections of a CTG, as well as determines one or more over-subscription factors based on an over-subscribed bandwidth determination. The physical bandwidth capabilities of component connections, as well as one or more placement priorities and/or holding priorities, can be supplied by a network administrator 517 or other network management system (not illustrated) of system 100. It is further contemplated that one or more of these component link characteristics may be determined and stored to component connection characteristics repository 511 on a per component connection per priority (or class of service) basis.

Accordingly, TE module 509 includes logic for determining aggregate characteristics of a CTG, such as CTG administrative cost, one or more CTG available bandwidths, and/or one or more maximum LSP bandwidths capable of being provisioned on the CTG. In certain embodiments, TE module 509 determines one or more CTG available bandwidths and one or more maximum LSP bandwidths on a per component connection per priority (or class of service) basis. Once these aggregate characteristics of a CTG (or CTG TE parameters) are determined, they may be stored to CTG characteristics repository 513 or any other suitable memory for provisioning label switched paths, as well as ported to announcement module 503 for announcement to transport network 519. Announced CTG TE parameters can be utilized by transport network 519 (e.g., system 100) for provisioning label switched paths on one or more CTGs. In other instances, announcement module 503 can be configured to receive one or more aggregate CTG characteristics from transport network 519, which may also be stored to CTG characteristics repository 513 (or other any other suitable memory) for provisioning label switched paths onto one or more CTGs. It is noted that announcement module 503 is also capable of announcing and/or receiving aggregate CTG characteristics on a per priority (or class of service) basis.

In this manner, routing control module 507 may be configured to utilize information stored to CTG characteristics repository 513 to control the flow of traffic through optical switch section 307 of optical node 300. According to other embodiments, CTG characteristics repository 513 may be accessed by routing control module 507 for the establishment, modification, and/or termination of one or more CTGs, as well as for routing network traffic through optical switch section 307 and selecting appropriate labels to append to the optical packet headers of optical packet payloads routed via optical switch section 307.

Accordingly, CTGs improve transport scalability by reducing the amount of information announced and, thereby, handled by singling and/or routing protocols, such as OSPF, IS-IS, etc., for the establishment of one or more traffic pathways. It is noted that this reduction is accomplished by performing information aggregation (or abstraction) based on and using information characteristic to particular CTGs, i.e., the attributes defining the characteristics of the component connections grouped into the particular CTGs. Thus, only aggregate CTG characteristics (TE parameters) need to be announced, whereas the characteristics of the various component connections forming the CTG do not have to be announced. It is contemplated, however, that the characteristics of the component connection may be announced, if so desired.

Figure 6:
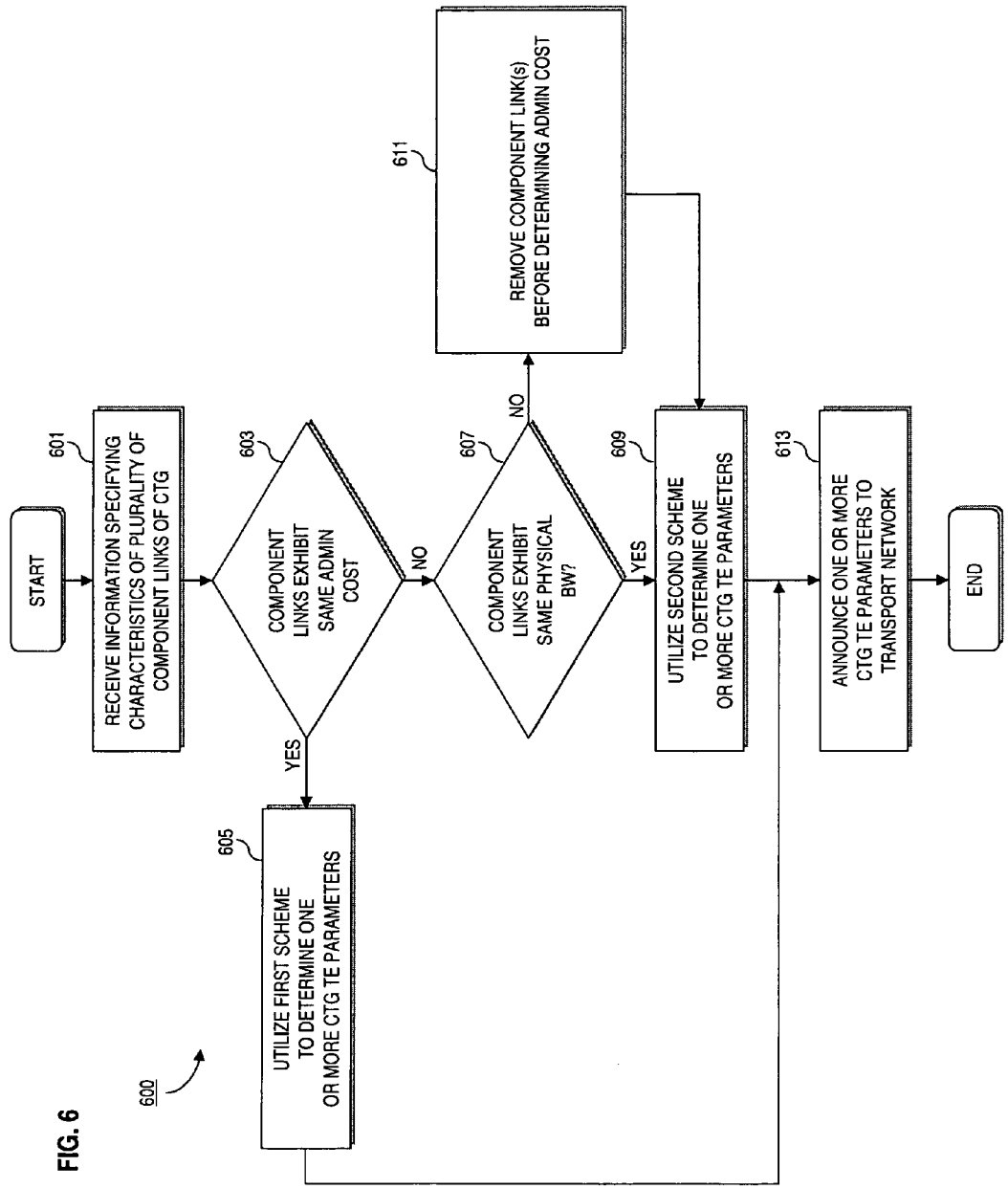
FIG. 6 is a flowchart of a process for announcing traffic engineering parameters of composite transport groups, according to an exemplary embodiment.

FIG. 6 is a flowchart of a process for announcing traffic engineering parameters of composite transport groups, according to various exemplary embodiments. For the purposes of illustration process 600 is described with reference to FIGS. 2 and 5. Moreover, the steps of process 600 may be performed in any suitable order or combined in any suitable manner.

In step 601, TE module 509 receives information specifying characteristics of a plurality of component links (e.g., component connections 205a-205m) of a configured CTG (e.g., CTG 203) from, for example, component connection characteristics repository 511. At step 603, TE module 509 determines whether each of the component links forming the CTG exhibit a same administrative cost. If each of the component links do exhibit the same administrative cost, then, whether or not each of the component links forming the CTG exhibit a same physical bandwidth, TE module 509 utilizes a scheme (per Table 1) for determining one or more aggregate CTG characteristics, such as a CTG administrative cost, one or more CTG available bandwidths, and one or more maximum LSP bandwidths capable of being provisioned on the CTG, per step 605. In exemplary implementations, the CTG available bandwidths and the maximum LSP bandwidths are determined per priority.

TABLE 1

Determining Aggregate CTG Characteristics Where all Component Links of CTG Exhibit a Same Administrative Cost

| | |
|---|---|
| Administrative Cost = | Administrative Cost of Individual Component Links |
| Available BW per Priority 1 = | Total CTG BW − Priority 1 BW |
| Available BW per Priority 2 = | Total CTG BW − (Priority 1 BW + Priority 2 BW) |
| . | . |
| . | . |
| . | . |
| Available BW per Priority N = | Total CTG BW − (Priority 1 BW + Priority 2 BW + . . . + Priority N BW) |
| Maximum LSP BW per Priority 1 = | Maximum Component Link Available BW Across Component Links per Priority 1 |
| . | . |
| . | . |
| . | . |
| Maximum LSP BW per Priority N = | Maximum Component Link Available BW Across Component Links per Priority N |
| where | |
| Total CTG BW = | Physical Component Link BW * Number of Component Connections |
| Priority 1 BW = | Sum of Provisioned BW for Priority 1 Across all Component Links |
| Priority 2 BW = | Sum of Provisioned BW for Priority 1 Across all Component Links |
| . | . |
| . | . |
| . | . |
| Priority N BW = | Sum of Provisioned BW for Priority N Across all Component Connections |
| Component Link Available BW per Priority 1 = | Component Link Physical BW − Sum of all Priority 1 Connection BW * Connection Over-Subscription Factor |
| . | . |
| . | . |
| . | . |
| Component Link Available BW per Priority N = | Component Link Physical BW − Sum of all Priority 1 Connection BW * Connection Over-Subscription Factor |
| BW = | Bandwidth |
| Priority = | CTG Connection Holding Priorities Ranging from 1 to 8 |

If, however, at least one of the component links forming the CTG exhibits a different administrative cost, then TE module 509 must determine whether or not each of the component links forming the CTG exhibit a same physical bandwidth, in step 607. If each of the component links exhibit a same physical bandwidth, then, in step 609, TE module 509 utilizes a second scheme, as characterized by the equations of Table 2, to determine one or more aggregate CTG characteristics, such as a CTG administrative cost, one or more CTG available bandwidths, and one or more maximum LSP bandwidths capable of being provisioned on the CTG. As with step 605, in exemplary embodiments, the CTG available bandwidths and the maximum LSP bandwidths are determined by TE module 509 on a per priority basis.

TABLE 2

Determining Aggregate CTG Characteristics Where at least one Component Link of CTG Exhibits a Different Administrative Cost

| | |
|---|---|
| Administrative Cost = | Minimum Administrative Cost of all Component Links Meeting a Predefined Criteria |
| Available BW per Priority = | Component Link Available BW across Component Links that Exhibit a Same Component Link Administrative Cost as the CTG Administrative Cost |
| Maximum LSP BW per Priority = | Maximum Component Link Available BW Exhibiting a Same Component Link Administrative Cost as the CTG Administrative Cost |
| where Predefined Criteria = | Component Link Available BW for Priority "X" is greater than or equal to "Y" percent of the Physical Component Link BW |
| X = | Priority Between 1 and 8 that is Predefined by a Network Administrator |
| Y = | Percentage that is Predefined by a Network Administrator |

If, however, at least one of the component links forming the CTG exhibits different physical bandwidths, then TE module 509 determines whether one or more component links is to be removed from the administrative cost determination, per step 611. Namely, TE module 509 determines whether any "relatively very small" bandwidth component links are bundled with other "relatively large" bandwidth component links to form the CTG. Assuming a relatively very small bandwidth component link exists, then TE module 509 will remove this component link from the determination of the CTG administrative cost, which also subsequently effects the CTG available bandwidth and maximum LSP bandwidth determinations. Even if no component links are removed, the process reverts to step 609, i.e., utilizing the scheme of Table 2 to determine one or more aggregate CTG characteristics. As such, a network administrator may establish any suitable threshold or percentage value for giving effect to the "relatively very small" and "relatively large" nominations. Routing control module 507, however, will still be able to route network traffic via removed component links by utilizing user specified routing features made available via one or more MPLS-TE protocols.

Once the aggregate CTG characteristics are determined, TE module may port the determined values to announcement module 503 for announcing one or more of the aggregate CTG characteristics to a transport network, e.g., system 100 (per step 613). The aggregate CTG characteristics can be announced on a per priority basis, as well. Furthermore, the aggregate CTG characteristics may also be stored to CTG characteristics repository 513 or any other suitable memory or repository of control module 500, optical node 300, and/or system 100, for later use.

Accordingly, network traffic may be routed over a CTG based on announced aggregate CTG characteristics (or TE parameters).

Figure 7:
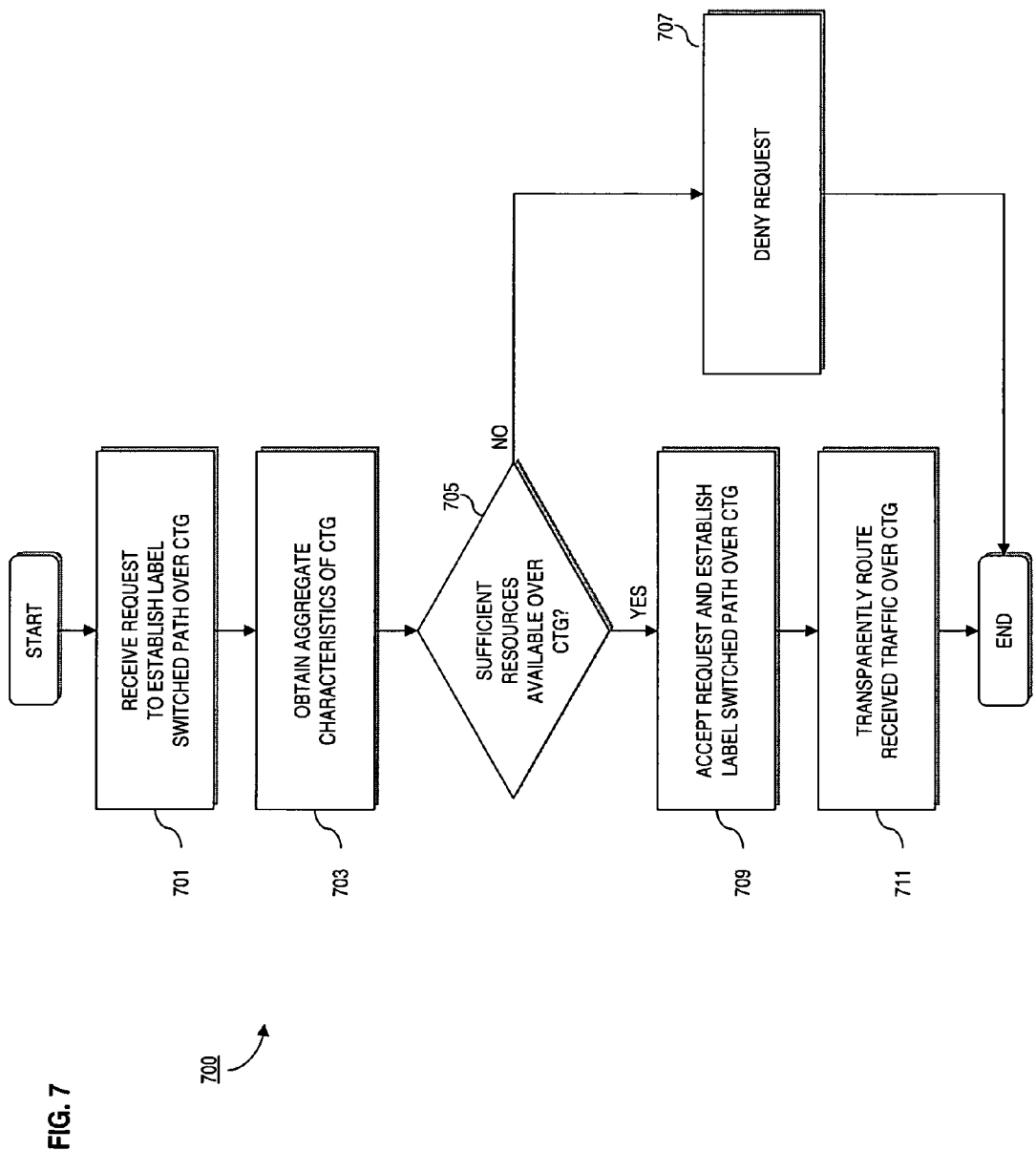
FIG. 7 is a flowchart of a process for routing traffic over a composite transport group based on announced traffic engineering parameters, according to an exemplary embodiment.

FIG. 7 is a flowchart of a process for routing traffic over a composite transport group based on announced traffic engineering parameters, according to an exemplary embodiment. For illustrative purposes, process 700 is described with reference to FIGS. 1-3 and 5. Moreover, the steps of process 700 may be performed in any suitable order or combined in any suitable manner.

In step 701, an ingress node (e.g., client node 101) receives a request from, e.g., an "upstream node" to establish an LSP over a CTG (e.g., CTG 203) that is provisioned between the ingress node and an egress node (e.g., optical node 103 or 105). The request to establish the LSP may include various LSP attributes, such as a requested reserved bandwidth, at a particular priority (or class of service), at (or less than) a certain administrative cost. Based on this request, a control module (e.g., control module 305) of the ingress node obtains the aggregate characteristics of the CTG from, for example, CTG characteristics repository 513, per step 703. In step 705, the control module determines whether there are sufficient resources available over the CTG by comparing the LSP request attributes with the aggregate CTG characteristics, i.e., the administrative cost, CTG available bandwidth at the requested priority, and/or the maximum LSP bandwidth at the requested priority capable of being provisioned on the CTG. If sufficient resources are not available, the ingress node denies the request, as in step 707, from the "upstream node." However, if there are sufficient resources available over the CTG, then the request is accepted and the LSP is established over the CTG, per step 709. When the LSP is established, the entire CTG is specified, such that the CTG selects the particular one or more component connections to host network traffic, while the "upstream node" merely views and selects the CTG as a single physical trunk. Thus, in step 711, when traffic is to be routed over the CTG, the traffic is routed transparently from the "upstream node," such that the choice of component link(s) to host network traffic is a local matter to the CTG.

The processes described herein for announcing traffic engineering parameters for composite transport groups may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
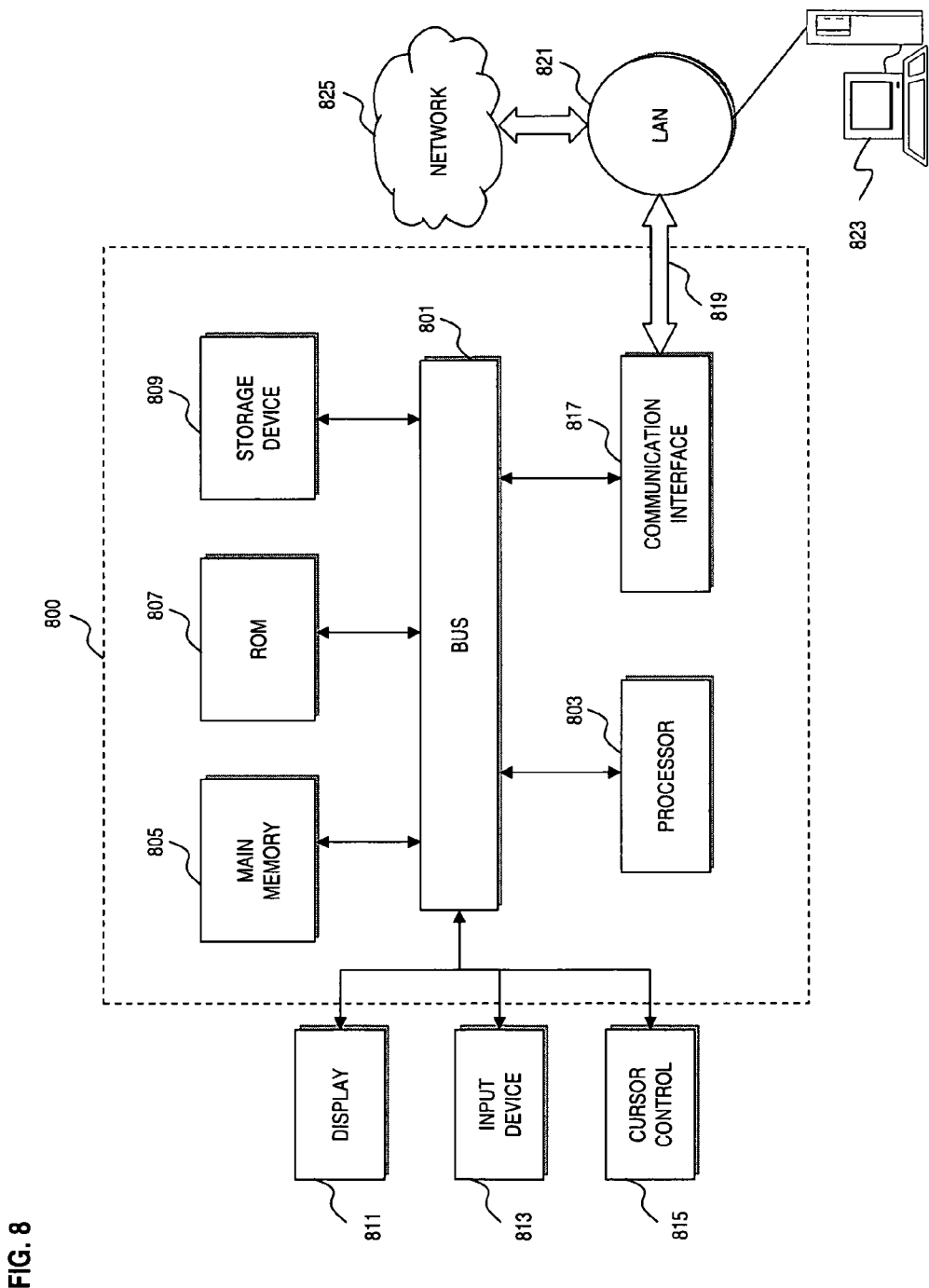
FIG. 8 is a diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving information specifying characteristics of a plurality of component links of a composite transport group;
   determining an aggregate characteristic of the composite transport group based on the information; and
   announcing the aggregate characteristic to a label switched network for provisioning label switched paths on the composite transport group.

2. A method according to claim 1, wherein the component links have the same administration costs and the same or different physical bandwidths.

3. A method according to claim 2, wherein the aggregate characteristic is an administration cost and is equivalent to the administration cost of any individual component link of the plurality.

4. A method according to claim 2, wherein the aggregate characteristic is an available bandwidth for a class of service, and the step of determining the aggregate characteristic includes,
- determining a total bandwidth for the composite transport group,
- determining a sum of provisioned bandwidth for every class of service lower than or equal to the class of service on each component link of the plurality, and
- subtracting the sum from the total.

5. A method according to claim 2, wherein the aggregate characteristic is a maximum label switched path bandwidth for a class of service, and the step of determining the aggregate characteristic includes,
- determining a component link available bandwidth for the class of service for each component link, and
- determining a maximum across the component link available bandwidths for the class of service,
- wherein the component link available bandwidth for the class of service for a particular component link is determined by subtracting a provisioned bandwidth on the particular component link for the class of service from a physical bandwidth of the particular component link.

6. A method according to claim 1, wherein the component links have different administration costs and either the same physical bandwidths or different physical bandwidths.

7. A method according to claim 6, wherein the aggregate characteristic is an available bandwidth for a class of service, and the step of determining the aggregate characteristic includes,
- determining a component link available bandwidth for each component link that has a same component link administration cost as an aggregate administration cost of the composite transport group, and
- determining a sum from these component link available bandwidths,
- wherein the aggregate administration cost of the composite transport group is a minimum across administration costs of component links meeting a predefined criteria.

8. A method according to claim 7, wherein a component link meets the predefined criteria if the component link exhibits an available bandwidth for a specified class of service greater than or equal to a specified percentage of a physical bandwidth of the component link.

9. A method according to claim 8, wherein one or more component links meeting the predefined criteria are removed before determining the minimum.

10. A method according to claim 6, wherein the aggregate characteristic is a maximum label switched path bandwidth for a class of service, and the step of determining the aggregate characteristic includes,
- determining a component link available bandwidth for the class of service for each component link that has a same component link cost as an aggregate administration cost of the composite transport group,
- determining a maximum from the component link available bandwidths,
- wherein the aggregate administration cost of the composite transport group is a minimum across administration costs of component links meeting a predefined criteria.

11. A method according to claim 1, wherein the information relates to administration costs, holding priorities, over-subscription factors, physical bandwidths, placement priorities, provisioned bandwidths, or a combination thereof.

12. An apparatus comprising:
- a processor configured to receive information specifying characteristics of a plurality of component links of a composite transport group, and to determine an aggregate characteristic of the composite transport group based on the information,
- wherein the aggregate characteristic is announced to a label switched network for provisioning label switched paths on the composite transport group.

13. An apparatus according to claim 12, wherein the component links have the same administration costs and the same or different physical bandwidths.

14. An apparatus according to claim 13, wherein the aggregate characteristic is an administration cost and is equivalent to the administration cost of any individual component link of the plurality.

15. An apparatus according to claim 13, wherein the aggregate characteristic is an available bandwidth for a class of service, and the processor is further configured to determine a total bandwidth for the composite transport group, to determine a sum of provisioned bandwidth for every class of service lower than or equal to the class of service on each component link of the plurality, and to subtract the sum from the total.

16. An apparatus according to claim 13, wherein the aggregate characteristic is a maximum label switched path bandwidth for a class of service, and the processor is further configured to determine a component link available bandwidth for the class of service for each component link, and to determine a maximum across the component link available bandwidths for the class of service,
- wherein the component link available bandwidth for the class of service for a particular component link is determined by subtracting a provisioned bandwidth on the particular component link for the class of service from a physical bandwidth of the particular component link.

17. An apparatus according to claim 12, wherein the component links have different administration costs and either the same physical bandwidths or different physical bandwidths.

18. An apparatus according to claim 17, wherein the aggregate characteristic is an available bandwidth for a class of service, and the processor is further configured to determine a component link available bandwidth for each component link that has a same component link administration cost as an aggregate administration cost of the composite transport group, and to determine a sum from these component link available bandwidths,
- wherein the aggregate administration cost of the composite transport group is a minimum across administration costs of component links meeting a predefined criteria.

19. An apparatus according to claim 18, wherein a component link meets the predefined criteria if the component link exhibits an available bandwidth for a specified class of service greater than or equal to a specified percentage of a physical bandwidth of the component link.

20. An apparatus according to claim 19, wherein one or more component links meeting the predefined criteria are removed before determining the minimum.

21. An apparatus according to claim 17, wherein the aggregate characteristic is a maximum label switched path bandwidth for a class of service, and the processor is further configured to determine a component link available bandwidth for the class of service for each component link that has a same component link cost as an aggregate administration cost of the composite transport group, and to determine a maximum from the component link available bandwidths,
- wherein the aggregate administration cost of the composite transport group is a minimum across administration costs of component links meeting a predefined criteria.

22. An apparatus according to claim 12, wherein the information relates to administration costs, holding priorities, over-subscription factors, physical bandwidths, placement priorities, provisioned bandwidths, or a combination thereof.

* * * * *